United States Patent [19]
Thomas

[11] 4,094,810
[45] June 13, 1978

[54] AQUEOUS SLURRY OF ASH CONCENTRATE COMPOSITION AND PROCESS FOR PRODUCING SAME

[75] Inventor: David C. Thomas, Oklahoma City, Okla.

[73] Assignee: Kerr-McGee Corporation, Oklahoma City, Okla.

[21] Appl. No.: 691,577

[22] Filed: Jun. 1, 1976

[51] Int. Cl.² ............................................. B01J 13/00
[52] U.S. Cl. .................................. 252/313 R; 44/51; 252/314; 302/66
[58] Field of Search ............... 252/313 R, 314; 44/51; 106/DIG. 1; 302/66

[56] References Cited

U.S. PATENT DOCUMENTS

| | | | |
|---|---|---|---|
| 2,833,659 | 5/1958 | Bauer | 106/DIG. 1 |
| 3,210,168 | 10/1965 | Morway | 44/51 |
| 3,642,445 | 2/1972 | Muter et al. | 106/DIG. 1 |
| 3,950,034 | 4/1976 | Dreher et al. | 302/66 |

*Primary Examiner*—Richard D. Lovering
*Attorney, Agent, or Firm*—William G. Addison

[57] ABSTRACT

An improved process for providing an aqueous slurry of an ash concentrate composition wherein predetermined amounts of the composition are mixed into a solution of water and a surfactant at a predetermined rate. The slurry is pumpable and is produced via the process of the present invention without the necessity of providing pH adjustments.

12 Claims, No Drawings

AQUEOUS SLURRY OF ASH CONCENTRATE COMPOSITION AND PROCESS FOR PRODUCING SAME

CROSS REFERENCE TO RELATED APPLICATIONS

Aspects of the present invention are related to subject matter disclosed in a co-pending application entitled "A POWDERY COMPOSITION COMPRISING INSOLUBLE COAL PRODUCTS AND SYSTEM FOR PRODUCING SAME IN A COAL DEASHING PROCESS", Ser. No. 691,573, filed on an even date herewith and assigned to the same assignee as the present invention, and now abandoned.

BACKGROUND OF THE INVENTION

1. Field of the Invention

The present invention relates generally to coal deashing aqueous slurries and systems for producing same and more particularly, but not by way of limitation, to an aqueous slurry of ash concentrate and system for producing same.

2. Description of the Prior Art

Various coal deashing processes have been developed in the past wherein coal has been treated with one or more solvents and processed to separate the resulting insoluble coal products from the soluble coal products. U.S. Pat. Nos. 3,607,716 and 3,607,717, issued to Roach and assigned to the same assignee as the present invention, disclose processes wherein coal is contacted with a solvent and the resulting mixture then is separated into a heavy phase containing the insoluble coal products and a light phase containing the soluble coal products. In such processes, the light phase is withdrawn and passed to downstream fractionating vessels wherein the soluble coal product is separated into multiple fractions. Other processes for separating the soluble coal products from the insoluble coal products utilizing one or more solvents are disclosed in U.S. Pat. Nos. 3,607,718 and 3,642,608, both issued to Roach et al., and assigned to the same assignee as the present invention.

DESCRIPTION OF THE PREFERRED EMBODIMENT

The present invention contemplates an aqueous slurry of an ash concentrate composition and a process for producing the aqueous slurry. In accordance with the present invention, a predetermined amount of surfactant is mixed with a predetermined amount of water and then predetermined amounts of a dry ash concentrate composition are added to the mixture of water and surfactant while mixing to produce the aqueous slurry. The aqueous slurry contemplated by the present invention is a flowable, pumpable mixture which contains up to about 60 percent solids.

The surfactant is one having a straight or branched long chain hydrocarbon group and an anionic, nonionic or cationic group. The anionic group is one selected from the group consisting of a carboxylic acid salt group, a sulfonate salt group, a sulfate group or a phosphate group. The nonionic group is one selected from the group consisting of ethers, hydroxyls, esters and amides. The cationic group is one selected from the group consisting of amines and quaternary ammonium salts. A particular anionic surfactant which was found suitable for forming the aqueous slurry of the present invention was a polyfunctional compound identified as "Polywet Oligomeric Surfactant" and commercially available from Uniroyal Chemical, such surfactant being designated as "POLYWET KX-3," for example. A nonionic surfactant which was found to be suitable for producing the aqueous slurry of the present invention is identified as "TRITON X-100" and is commercially available from Rohm and Haas, for example. This last-mentioned surfactant causes foaming when utilized to form the aqueous slurry in accordance with the present invention and a defoamant or defoaming agent should be added to the slurry to control such foaming.

The ash concentrate composition comprises insoluble coal products. A process for producing this dry, powdery ash concentrate and the ash concentrate composition per se are disclosed in detail in the co-pending application entitled "A POWDERY COMPOSITION COMPRISING INSOLUBLE COAL PRODUCTS AND SYSTEM FOR PRODUCING SAME IN A COAL DEASHING PROCESS," mentioned before and assigned to the same assignee as the present invention, the disclosure of such application being incorporated herein by reference. In general, the ash concentrate composition is produced via a coal deashing process designed to separate the soluble coal products from the insoluble coal products. In a particular coal deashing process coal was contacted and mixed with a first dissolving solvent in a first mixing zone, solubilized and flashed to provide a prepared mixture which was passed into a second mixing zone. In the second mixing zone, the prepared mixture was mixed with a second dissolving solvent to provide a feed mixture which was passed to a first separation zone wherein the feed mixture was separated into a first heavy fraction (comprising the insoluble coal products and some of the second dissolving solvent) and a first light fraction (comprising the soluble coal products and most of the second dissolving solvent). The soluble coal products were separated from the second dissolving solvent in a second separation zone. The first heavy fraction was withdrawn from the first separation zone and flashed to produce one stream comprising the second dissolving solvent and one other stream comprising the insoluble coal products. The temperature level and the pressure level in the first separation zone each were maintained at predetermined levels so the stream comprising the insoluble coal products produced via flashing the first heavy fraction was in a dry, powdery, solid form. The flashed first heavy fraction stream comprising the insoluble coal products which was produced in the manner just described comprises the composition referred to herein as "ash concentrate composition."

The physical properties of the ash concentrate composition contemplated via the present invention and produced in a manner generally described above are summarized in Table I, below:

TABLE I

| | |
|---|---|
| Bulk Density | 31 lb/ft$^3$ |
| Particle Density | 97 lb/ft$^3$ |
| Angle of Repose | 40–45 degrees |
| Size Distribution | |
| Tyler Screen Mesh Size | Weight Percent |
| +28 | 9.0 |
| −28 +48 | 13.6 |
| −48 +65 | 8.2 |
| −65 +100 | 8.4 |
| −100 +150 | 8.5 |
| −150 +200 | 9.6 |
| −200 +270 | 7.3 |
| −270 +400 | 8.1 |
| −400 | 27.3 |

The aqueous slurry and the process of producing such aqueous slurry as contemplated via the present invention are illustrated by the following examples.

EXAMPLE I

An aqueous ash concentrate slurry was produced by adding 0.24 grams (0.1 percent by weight of ash concentrate) of POLYWET KX-3 (surfactant) to 160 grams of water and mixing the resulting mixture by gently stirring same. Relatively small portions of the ash concentrate composition were added to the mixture of water and surfactant until a total of 240 grams of the ash concentrate composition had been added. After each portion of the ash concentrate composition was added to the water and surfactant mixture, the slurry was stirred until the ash concentrate composition had wetted into the slurry. An additional 0.05% by weight of the surfactant was added to adjust the viscosity of the slurry to the desired level. The resulting aqueous slurry of ash concentrate composition comprised 0.15 percent by weight of surfactant (POLYWET KX-3) in a 60 percent solids slurry and the resulting aqueous slurry of the ash concentrate composition was fluid and pumpable.

EXAMPLE II

An aqueous ash concentrate slurry was produced by adding 0.6 grams (0.8 percent by weight of ash concentrate) of TRITON X-100 (surfactant) to 48.0 grams of water and mixing the resulting mixture by gently stirring same. Relatively small portions of the ash concentrate composition were added to the mixture of water and surfactant until a total of 72.3 grams of the ash concentrate composition had wetted into the slurry. The resulting aqueous slurry of ash concentrate composition comprised 0.8 percent by weight of surfactant (TRITON X-100) in a 60 percent solids slurry and this slurry of the ash concentrate composition was fluid and pumpable. During the preparation of this aqueous ash concentrate composition slurry, a relatively heavy foam was formed causing the slurry to have a thick consistency. To counteract this foaming, a drop (0.05 cc) of a defoamant (commercially available from Nalco and identified as 4WP-126) was added and as a result, the pumpability of the slurry was increased. Also, it was determined that the surfactant level in this particular example could be reduced to a much lower level.

When producing the aqueous ash concentrate composition slurry in a manner contemplated via the present invention, it is not necessary to control the pH level of the slurry (no pH level adjustments are required) and the slurry is produced in a manner utilizing a minimum amount of surfactant.

The surfactant must be added to produce the aqueous ash concentrate slurry of the present invention and, if a sufficient level of surfactant is not added, the slurry contemplated via the present invention will not be formed. For example, when utilizing POLYWET KX-3 as the surfactant, a minimum of between about 0.1 percent by weight and about 0.15 percent by weight of surfactant must be added to form the aqueous ash concentrate composition slurry, for example.

There is a maximum solids level with respect to the formation of the aqueous slurry of the present invention and the exact solids level is believed to be dependent upon the particular type of surfactant utilized. Although the precise maximum solids level is not known, it is believed that the maximum solids level is about 60 percent.

The slurry of the ash concentrate composition produced in accordance with the present invention is useful for pipeline transportation of finely crushed coal or ash concentrate.

Changes may be made in the process or in the steps of the process or in the sequence of the steps of the process of the present invention or in the composition of the present invention without departing from the spirit and scope of the invention as defined in the following claims.

What is claimed is:

1. A process for producing an aqueous slurry of an ash concentrate composition comprising insoluble coal products, said process comprising the steps of:

mixing a predetermined amount of surfactant with water to form a mixture in which the surfactant comprises at least about 0.1 percent by weight of the mixture of surfactant and water;

adding up to about 60 percent said ash concentrate composition to the mixture of surfactant and water; and mixing said ash concentrate composition, the water and the surfactant while adding said ash concentrate composition to produce said aqueous slurry of the ash concentrate composition.

2. The process of claim 1 wherein said ash concentrate composition is defined further as being powdery in form and having a bulk density of about 31 lb/ft$^3$.

3. The process of claim 2 wherein said ash concentrate composition is further defined as having a particle density of about 97 lb/ft$^3$.

4. A process for producing an aqueous slurry of an ash concentrate composition comprising insoluble coal products, said process comprising the steps of:

mixing a predetermined amount of surfactant with water to form a mixture in which the surfactant comprises at least about 0.1 percent by weight of the mixture of surfactant and water;

adding up to about 60 percent said ash concentrate composition to the mixture of the surfactant and water by adding a portion of said ash concentrate composition to the mixture of surfactant and water until all of said ash concentrate composition has been added to the mixture of the surfactant and water; and mixing said ash concentrate composition, the water and the surfactant while adding each portion of said ash concentrate composition to the mixture of the surfactant and water.

5. A process for producing an aqueous slurry of an ash concentrate composition comprising insoluble coal products, said process comprising the steps of:

mixing a predetermined amount of surfactant with water to form a mixture in which the surfactant comprises at least about 0.1 percent by weight of the mixture of surfactant and water;

adding up to about 60 percent said ash concentrate composition to the mixture of water and surfactant; and mixing said ash concentrate composition with the water and the surfactant to produce a pumpable aqueous slurry of said ash concentrate composition.

6. The process of claim 5 wherein the surfactant is defined further as one having a straight or branched long chain hydrocarbon group and an anionic, nonionic or cationic group.

7. The process of claim 6 wherein the anionic group is defined further as being one selected from the group consisting of a carboxylic acid salt, a sulfonate salt, a sulfate group and a phosphate group.

8. An aqueous slurry comprising:
water;
a predetermined amount of surfactant mixed with the water to form a mixture in which the surfactant comprises at least about 0.1 percent by weight of the mixture of surfactant and water; and
an ash concentrate composition comprising insoluble coal product mixed with the water and the surfactant to form an aqueous slurry containing up to about 60 percent of said ash concentrate composition.

9. The aqueous slurry of claim 8 wherein said ash concentrate composition is defined further as being powdery in form, and having a bulk density of about 31 lb/ft$^3$.

10. The aqueous solution of claim 9 wherein said ash concentrate composition is defined further as having a particle density of about 97 lb/ft$^3$.

11. The aqueous slurry of claim 8 wherein the surfactant is defined further as one having a straight or branched long chain hydrocarbon group and an anionic, nonionic or cationic group.

12. The aqueous slurry of claim 11 wherein the anionic group is defined further as being one selected from the group consisting of a carboxylic acid salt, a sulfonate salt, a sulfate group and a phosphate group.

* * * * *